United States Patent
Cheung et al.

(10) Patent No.: US 8,234,504 B2
(45) Date of Patent: Jul. 31, 2012

(54) METHOD AND SYSTEM FOR DATA ENCRYPTION AND DECRYPTION

(75) Inventors: Francis Cheung, Del Mar, CA (US);
Jason Monroe, Ladera Ranch, CA (US);
Kevin Patariu, San Diego, CA (US);
Iue-Shuenn Chen, San Diego, CA (US);
Cynthia Dang, Cerritos, CA (US);
Mark Taylor Core, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2072 days.

(21) Appl. No.: 10/414,575

(22) Filed: Apr. 15, 2003

(65) Prior Publication Data

US 2004/0250096 A1    Dec. 9, 2004

(51) Int. Cl.
*G06F 21/00* (2006.01)
(52) U.S. Cl. ........................................ 713/189
(58) Field of Classification Search .................. 713/193, 713/189
See application file for complete search history.

(56) References Cited

U.S. PATENT DOCUMENTS

| | | | |
|---|---|---|---|
| 5,623,637 A * | 4/1997 | Jones et al. ................... | 711/164 |
| 5,818,939 A | 10/1998 | Davis et al. | |
| 5,825,878 A * | 10/1998 | Takahashi et al. ............ | 713/190 |
| 5,828,753 A * | 10/1998 | Davis ............................ | 713/189 |
| 5,878,142 A | 3/1999 | Caputo et al. | |
| 5,892,826 A * | 4/1999 | Brown et al. ................. | 713/190 |
| 6,158,004 A * | 12/2000 | Mason et al. ................. | 713/150 |
| 6,240,516 B1 | 5/2001 | Vainsencher | |

FOREIGN PATENT DOCUMENTS

| | | |
|---|---|---|
| EP | 1191739 A | 3/2002 |
| EP | 1282261 A | 2/2003 |

* cited by examiner

*Primary Examiner* — Jason Gee
(74) *Attorney, Agent, or Firm* — Sterne, Kessler, Goldstein & Fox P.L.L.C.

(57) ABSTRACT

Certain embodiments of the invention provide a method and system for memory to bus interface data encryption and decryption. A method for memory to bus interface data encryption and decryption may include encrypting data by a encryption/decryption engine or processor and transferring the encrypted data across a first bus interface to a data processing and/or storage device coupled to the first bus interface. The encryption engine may receive encrypted data from a device coupled to the first bus interface and decrypt the received encrypted data. In this regard, unencrypted data never traverses across the first bus interface, and is thereby not accessible to devices coupled to the first bus interface. An encryption function and a decryption function associated with the encryption/decryption engine may be integrated within a bus adapter, for example, an IDE bus adapter.

7 Claims, 3 Drawing Sheets

METHOD AND SYSTEM FOR DATA ENCRYPTION AND DECRYPTION

CROSS-REFERENCE TO RELATED APPLICATIONS/INCORPORATION BY REFERENCE

This application makes reference to, claims priority to and claims the benefit of U.S. Provisional Patent Application Ser. No. 60/454,783 entitled "System and Method for Data Encryption and Decryption" filed on Mar. 14, 2003.

This application also makes reference to: U.S. patent application Ser. No. 10/414,844 entitled "Method And System For Data Encryption And Decryption" filed on Apr. 15, 2003; U.S. patent application Ser. No. 10/414,724 entitled "Method And System For Controlling An Encryption/Decryption Engine Using Descriptors" filed on Apr. 15, 2003; U.S. patent application Ser. No. 10/414,577 entitled "Method And System For Data Encryption/Decryption Key Generation And Distribution" filed on Apr. 15, 2003; and U.S. patent application Ser. No. 10/417,051 entitled "Method And System For Secure Access And Processing Of An Encryption/Decryption Key" filed on Apr. 16, 2003.

The above stated applications are incorporated herein by reference in their entirety.

FIELD OF THE INVENTION

Certain embodiments of the invention relate to data security. More specifically, certain embodiments of the invention relate to a method and system for data encryption and decryption.

BACKGROUND OF THE INVENTION

In some conventional encryption applications, it is necessary to send data to a hard disk to be encrypted and retrieve data from the hard disk for decryption. One such application is personal video recording (PVR). In such systems, the encryption/decryption functions are implemented by separate devices between the ATA host adapter and the ATA bus connector. ATA stands for AT Attachment, a standardized interface used by storage devices such as hard disk drives, CD drives and DVD drives. ATA compatible drives may also be referred to as integrated drive electronics (IDE) drives. One drawback with conventional separate device implementations is that unencrypted or "clear" data is available at the interface between the ATA host adapter and the external encryption/decryption chip, and can be intercepted and stored in unencrypted form. Additionally, the encryption used in conventional systems is not particularly "strong" and could be broken relatively easily.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for data encryption and decryption. The method for data encryption may include encrypting within a chip, data received from a device coupled to a second bus. The encrypted data may be transferred to an external device coupled to a first bus. A bus controller integrated within the chip may be adapted to facilitate and control the transfer. The bus controller may be adapted to receive encrypted data from an external device coupled to the first bus. The encrypted data may be decrypted within the chip and transferred to a device coupled to the second bus.

At least one encryption key may be identified and selected for use during an encryption operation. Similarly, at least one decryption key may be identified and selected for use during a decryption operation. At least one encryption processor may be instructed to perform an encryption operation on the data using one or more encryption keys. Similarly, at least one decryption processor may be instructed to perform a decryption operation on the data using one or more encryption keys. Data received from the device coupled to the second bus may be buffered prior to being encrypted. Encrypted data received from the external device coupled to the first bus may be also buffed prior to being decrypted.

In another aspect of the invention, if a bypass operation or function is selected, then the encrypting and decrypting operations may be bypassed. Accordingly, an encrypted/unencrypted state of the data remains the same. The first bus may be, for example, an IDE, PCI, SCSI, USB or other suitable bus. The second bus may be a memory bus. The external device may be a memory and/or a data processing device.

Another embodiment of the invention provides, a machine-readable storage, having stored thereon a computer program having at least one code section for providing data encryption and decryption, the at least one code section executable by a machine for causing the machine to perform the steps as described above.

Another aspect of the invention provides a system for data encryption and decryption. The system for data encryption may include at least one encryption/decryption processor adapted to encrypt within a chip, data received from a device coupled to a second bus. A bus interface may be adapted to transfer encrypted data to an external device coupled to a first bus. A bus controller integrated within the chip may be adapted to facilitate the transfer. At least one buffer may be provided and adapted to receive encrypted data from the external device coupled to the first bus. The bus controller may be adapted to facilitate receiving of the encrypted data from the first bus. At least one encryption/decryption processor may be adapted to decrypt the received encrypted data. A second bus interface may be adapted to transfer the decrypted data to the device coupled to the second bus.

A key and encryption/decryption selector and controller may be adapted to identify at least one encryption key to be utilized for said encryption. The key and encryption/decryption selector and controller may be further adapted to identify at least one decryption key to be utilized by the decryption operation. The key and encryption/decryption selector and controller may be further adapted to instruct at least one encryption/decryption processor to perform the encryption using one or more encryption keys and to instruct one or more encryption/decryption processors to perform decryption using said at least one decryption key.

The at least one buffer may be adapted to buffer data received from the device coupled to the second bus prior to the encryption operation. The at least one buffer may be also further adapted to buffer encrypted data received from the external device coupled to the first bus prior to the decryption operation. At least one selector may be provided and adapted to bypass the encrypting and decrypting operation if a bypass operation is to be performed. In accordance with the invention, the first bus may be, for example, one of an IDE, PCI, SCSI, and USB bus. The second bus may be a memory bus. The external device may be a memory and/or a data processing device.

These and other advantages, aspects and novel features of the present invention, as well as details of a illustrated embodiment thereof, will be more fully understood from the following description and drawings.

DETAILED DESCRIPTION OF THE INVENTION

Figure 1:
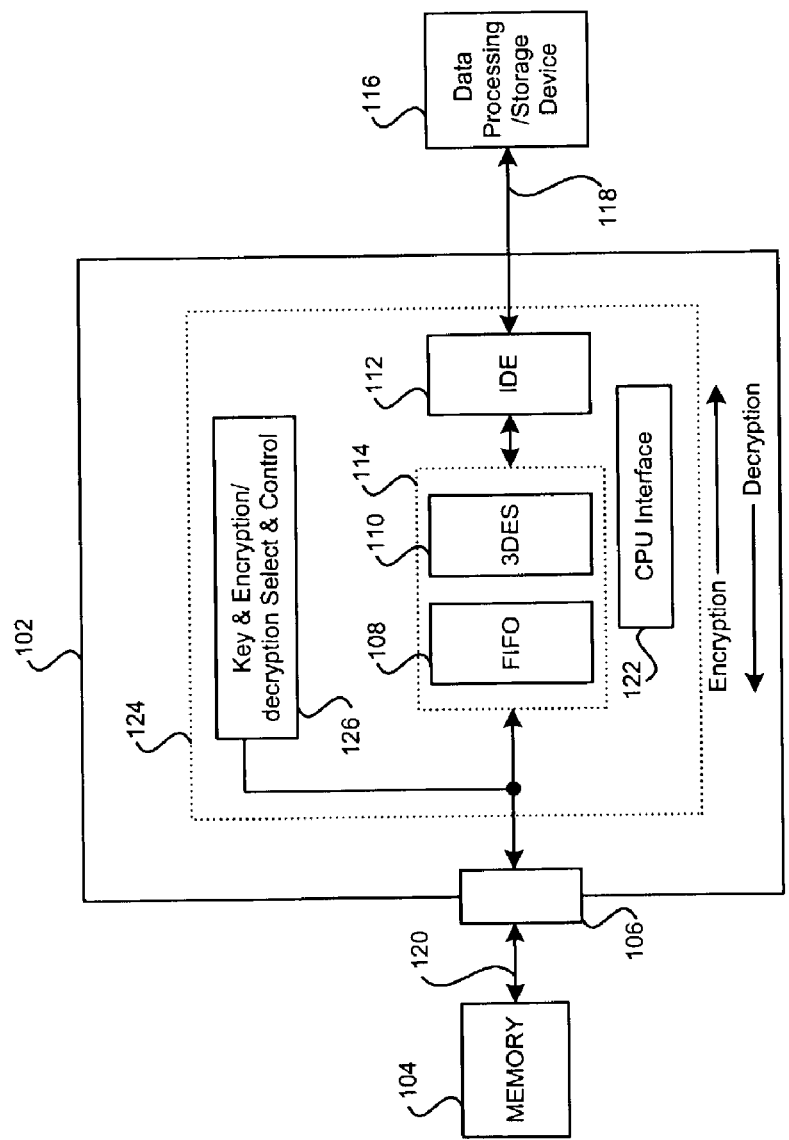
FIG. 1 is a block diagram of an exemplary system for memory to IDE encryption/decryption in accordance with an embodiment of the invention.

Certain embodiments of the invention provide a method and system for memory to bus interface data encryption and decryption. A method for memory to bus interface data encryption and decryption may include encrypting data by a encryption/decryption engine or processor and transferring the encrypted data across a first bus interface to a data processing and/or storage device coupled to the first bus interface. The encryption engine may receive encrypted data from a device coupled to the first bus interface and decrypt the received encrypted data. In this regard, unencrypted data never traverses across the first bus interface, and is thereby not accessible to devices coupled to the first bus interface. An encryption function and a decryption function associated with the encryption/decryption engine may be integrated within a bus adapter, for example, an IDE bus adapter.

In an embodiment of the invention, the method for data encryption may include the integration of an encryption function into an ATA host adapter, thereby eliminating the presence of unencrypted data on an external ATA bus to which the ATA host adapter may be coupled. The method may utilize 3DES/DES encryption/decryption, which may be stronger than encryption/decryption methods utilized in conventional systems, and hence more difficult to break.

In one embodiment of the invention, the IDE host interface may be a two channel ATA host adapter that conforms to the AT Attachment with Packet Interface (ATA/ATAPI-5) specification. In this regard, the two channel host adapter may include a primary and a secondary channel. The IDE host interface may be adapted to function as a bus bridge between an internal local bus and an external ATA bus to support programmed I/O (PIO) data transfer. The IDE host interface may also include a memory bus interface and DMA controllers to support legacy multiword DMA as well as ultra-DMA data transfer protocols. Cyclic redundancy check (CRC) generation for ultra-DMA transfers may also be performed in compliance with the ATA/ATAPI-5 specification.

In accordance with an aspect of the invention, pin count may be reduced by utilizing a design that shares a single ATA address, data, and chip select busses between the primary and secondary channels. In this arrangement, each channel may be adapted to support a master and a slave device for a maximum of four IDE devices. The design may include two 64-bit 3DES/DES encryption/decryption cores that can optionally be used to encrypt or decrypt DMA transfers to or from IDE devices. Configuration and control of the encryption/decryption operation may be accomplished using a DES control register. Two or more 128-bit key registers, for example, may also be provided and these registers may be programmed using a two-wire serial key bus from a transport block.

By integrating the encryption/decryption function into the IDE host interface, cost may be significantly reduced relative to an external encryption/decryption solution. Moreover, the presence of unencrypted data on the external ATA bus is also eliminated, thereby eliminating data intrusion. The 3DES/DES encryption may be more robust and accordingly, more difficult to decipher than conventional methods.

FIG. 1 is a block diagram of an exemplary system for memory to IDE encryption/decryption in accordance with an embodiment of the invention. Referring to FIG. 1, there is shown a chip 102 having integrated therein, an IDE controller block 124. IDE controller block 124 may include a FIFO block 108, 3DES block 110, IDE interface block 112, CPU interface 122 and key and encryption/decryption select and control block 126. The 3DES block 110 and the FIFO block 108 may form an encryption/decryption processor block 114. Chip 102 may include a memory and/or bus interface block 106.

The IDE interface block 112 may be coupled to an external data processing/storage device 116 via a first bus and/or bus interface 118. The first bus 118 may be an ATA bus, although the invention is not limited in this regard. Alternatively, the first bus 118 may be, for example, a SCSI bus, a PCI bus, USB or other suitable bus. The external data processing/storage device 116 may be, for example, a hard disk, memory or data processing or storage device.

Chip 102 may also include a bus interface block 106. The FIFO block 108 may be coupled to the bus interface block 106. A memory 104 may be coupled to the bus interface block 106 via a second bus 120. The memory 104 may be a random access memory (RAM) such as a dynamic RAM (DRAM). In this regard, the memory and/or bus interface block 106 may be a DRAM controller, for example. The exemplary system of FIG. 1 could be part of a personal video recording (PVR) system.

Although chip 102 may include IDE controller block 124, the invention is not limited in this regard. In general, chip 102 may alternatively include any suitable bus controller block such as a PCI controller block or SCSI controller block, instead of IDE controller block 124. In this regard, the IDE controller block 124 may be replaced by a PCI controller block or a SCSI controller block respectively. For example, in a case where IDE controller block 124 is replaced by a PCI controller block, then IDE interface block 112 may be replaced by a PCI interface block. In a case where IDE controller block 124 is a SCSI controller block, then IDE interface block 112 may be replaced by a SCSI interface block. Accordingly, the PCI interface block or the SCSI interface block may be coupled to the external data processing/storage device 116 via the first bus 118.

The key and encryption/decryption select and control block 126 may include suitable control logic and/or circuitry that may be adapted to select a function to be performed by the encryption/decryption processor block 114. In this regard, the encryption/decryption processor block 114 may be adapted to select or deselect one of an encryption operation, a decryption operation and a bypass function. The control logic and/or circuitry in the key and encryption/decryption select and control block 126 may be further adapted to facilitate selection and control of encryption and decryption keys to be utilized by the 3DES block 110. In this regard, the key and encryption/decryption select and control block 126 may control which of a plurality of keys may be utilized by the 3DES block 110. The key and encryption/decryption select and control block 126 may further include suitable control logic and/or circuitry that may be adapted to provide various select signals that may be used to route data throughout chip 102 when any of the encryption, decryption, or bypass functions or operations may be required.

The CPU interface block 122 may include suitable logic and/or circuitry that may be adapted to provide control of the operation of chip 102 by an external processor. The external processor may be a host processor.

In operation, data to be encrypted by the encryption/decryption processor block 114 and transferred to the external data processing/storage device 116, may be received from the memory 104 via the second bus 120. The data to be encrypted may be transferred to the encryption/decryption processor block 114 where it may be buffered in FIFO buffer 108. The memory or bus interface block 106 may be adapted to control the transfer of the data to be encrypted from the memory 104 to the FIFO buffer 108. The received data in the FIFO buffer 108 may be encrypted by the 3DES block 110 and communicated to the IDE interface block 112. The IDE interface block 112 may be adapted to transfer the encrypted data to the external data processing/storage device 116 via the first bus 118. In this regard, the unencrypted data may never be placed on the first bus 118 where it may be accessible by other devices coupled to the first bus.

In operation, encrypted data stored in the external data processing/storage device 116 may be transferred from the external data processing/storage device 116 for decryption by the encryption/decryption processor block 114. The IDE interface block 112 may be adapted to control the transfer of the encrypted data from the external data processing/storage device 116 via the first bus 118. To facilitate decryption, the transferred encrypted data may first be buffered in the FIFO block 108 and then decrypted by the 3DES block 110. Subsequent to decryption, the decrypted data may be transferred to the memory 104. The memory and/or bus interface block 106 may be adapted to facilitate the transfer of the decrypted data to the memory 104 via bus 120. In this regard, unencrypted data may never be placed on the first bus 118 where it might be accessible by other devices coupled to the first bus 118.

Figure 2:
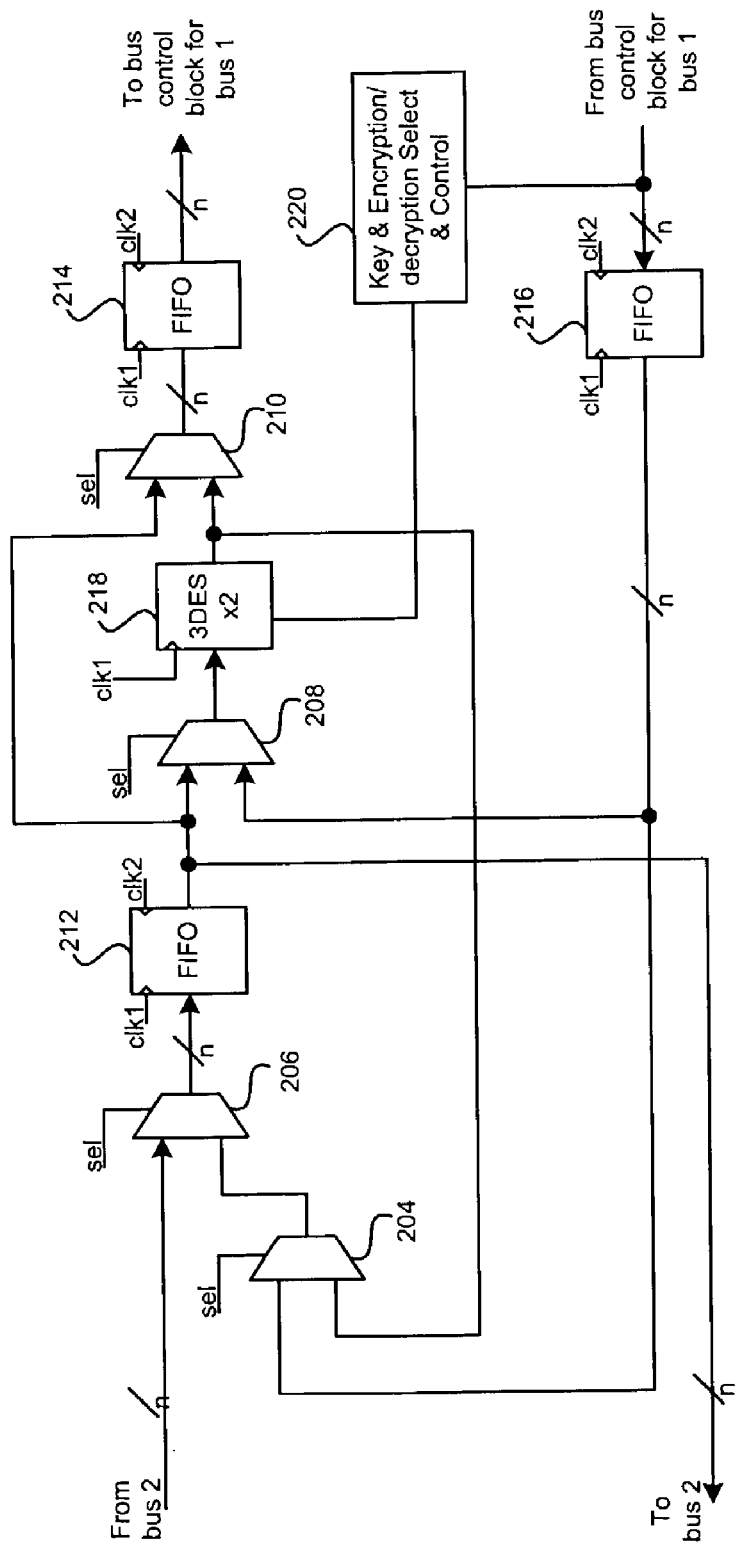
FIG. 2 is a block diagram illustrating the encryption/decryption of data using exemplary memory to IDE system of FIG. 1 in accordance with an embodiment of the invention.

FIG. 2 is a block diagram illustrating the encryption/decryption of data using exemplary memory to IDE system of FIG. 1 in accordance with an embodiment of the invention. Referring to FIG. 2, there are shown selectors 204, 206 208, 210, FIFO buffers 212, 214, 216, 3DES block 218 and key and encryption/decryption select and control block 220. The selectors 204, 206, 208, 210 may be multiplexers. FIFO 212 may be a bus buffer, FIFO 214 may be a read buffer and FIFO 216 may be a write buffer. The selectors 204, 206 208, 210, FIFO buffers 212, 214, 216 and 3DES block 218 may be adapted to handle n-bit wide data. In one aspect of the invention, n may be, for example, 128 or other suitable value. Each of the FIFOs 212, 214, 216 may be adapted to handle a first clock domain clk1 associated with a first bus and a second clock domain clk2 associated with a second bus. The first clock domain may be an 81 MHz clock and the second clock domain may be a 33 MHz clock, although the invention is not limited in this regard. In one aspect of the invention, a plurality of 3DES block 218 may be provided for encrypting and decrypting data.

The key and encryption/decryption select and control block 220 may include suitable logic that may be used to select or deselect a first and/or a second input of each of the selectors 204, 206, 208, 210. The key and encryption/decryption select and control block 220 may use the select pins of selectors 204, 206, 208, 210 to select or deselect a particular selector. In this regard, the key and encryption/decryption select and control block 220 may be used to route data through chip 102 during an encryption or decryption operation, or a bypass function.

During encryption, unencrypted data may be received from a device connected to a second bus. The device may be a memory device such as memory 104 (FIG. 1). Selector 206 may be enabled via a select pin, which may be adapted to permit the unencrypted data to be loaded into FIFO buffer 212 via a first input of selector 206. The buffered unencrypted data may be encrypted by the 3DES block 218. In this regard, the selector 208 may be enabled by its select pin. While selector 210 is disabled or deselected via its select pin, the unencrypted data may then be communicated from the FIFO 212 through a first input of selector 208 to the 3DES block 218. The 3DES block may encrypt the unencrypted data. Selector 210 may be enabled by its select pin and a second input of selector 210 may communicate any resulting encrypted data to the FIFO 214. The encrypted data may then be communicated via a first bus to, for example, a memory or other processing device connected to the first bus. In this regard, the data being transferred over the first bus may be encrypted.

In accordance with another aspect of the invention, a bypass function may also be provided. In a case where encrypted data may be transferred from the memory connected to the first bus to a memory or processing device connected to the second bus, the 3DES block 218 may be bypassed. In this case, the selector 208 may be deselected or disabled by its select pin. However, selector 210 may be selected and a first input of selector 210 may be used to facilitate transfer of the encrypted data from the FIFO 212 to FIFO 214.

During decryption, encrypted data may be received from a device connected to the first bus. The device may be an external data processing/storage device 116 of FIG. 1. The encrypted data may be buffered in FIFO 216. Selector 208 may be enabled by its select pin and the encrypted data may be communicated to 3DES block 218 via a second input of selector 208. After the encrypted data is decrypted by 3DES block 218, while selector 110 may be deselected or disabled by its select pin, selector 204 and selector 206 may be enabled by their respective select pins. The decrypted data may be transferred to the buffer 212 via a second input of selector 204 and a second input of selector 206 respectively. While selector 208 may be deselected or disabled by its select pin, the decrypted data may be transferred from the FIFO buffer 212 to the memory coupled to the second bus.

Figure 3:
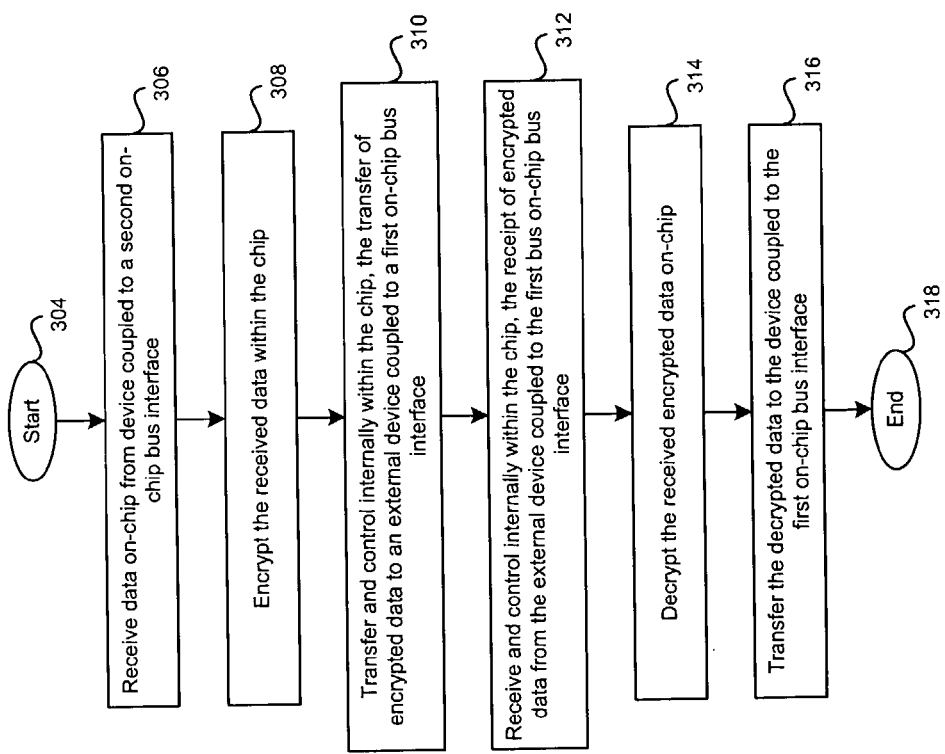
FIG. 3 is a flow chart illustrating exemplary steps for encrypting and decrypting data in accordance with an embodiment of the invention.

FIG. 3 is a flow chart illustrating exemplary steps for encrypting and decrypting data in accordance with an embodiment of the invention. The exemplary steps may start with step 304. Subsequently, in step 306, data may be received on-chip from a device coupled to a second on-chip bus interface. In step 308, the received data may be encrypted within the chip. In step 310, the encrypted data may be transferred to an external device coupled to the first on-chip bus interface, the transfer being controlled within the chip. In step 312, encrypted data may be received from the external device coupled to the first on-chip bus interface, the receipt of the encrypted data being controlled within the chip. In step 314, the received encrypted data may be decrypted on-chip. In step 314, the decrypted data may be transferred to the device coupled to the first on-chip bus interface. Finally, the steps may end at step 318. Referring to step 310, at least one on-chip controller may be adapted to internally control the transfer of the encrypted to the external device coupled to the first on-chip bus interface. The on-chip controller may also be adapted to control the receipt of the encrypted data from the external device coupled to the first bus.

In another aspect of the invention, a 3DES encryption/decryption simulation may be provided to illustrate exemplary encryption and decryption processes. During the simulation, an input data may be acquired from an input file. For example, an input file, namely test1.encrypt.dat, may contain the following information:

0 0 01234567 89abcdef fedcba98 76543210
23456789 abcdef01
456789ab cdef0123

In this regard, the input file may specify a 3DES encryption using a key of, for example, 01234567 89abcdef fedcba98 76543210, on two 64-bit words of data. The two 64-bit words of data may be 23456789abcdef01 and fedcba9876543210.

Upon executing the 3DES operation using, for example, 3DES block 208 of FIG. 2, with the test1.encrypt.dat input file, an output file may be generated. In this regard, an output file, namely test1.encrypt.dat.out, may be generated. The contents of the generated test1.encrypt.dat.out file may be as follows:

a47606af 132eeff7
792e2b91 7c75dce4

The encrypted data in the test1.encrypt.dat.out file may be decrypted using the following test1.decrypt.dat.in file. The contents of the test1.decrypt.dat.in file may be as follows.

1 0 01234567 89abcdef fedcba98 76543210
a47606af 132eeff7
792e2b91 7c75dce4

Upon decryption of the test1.decrypt.dat.in file, an output file, namely test1.decrypt.dat may be generated. The contents of test1.decrypt.dat file may be as follows.

23456789 abcdef01
456789ab cdef0123

In this case, the decryption returns the original data.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A personal video recording system for encrypting and decrypting data, the system comprising:
   an encryption/decryption processor integrated within a chip configured to:
      encrypt within the chip data received from a first device external to the chip utilizing a plurality of keys stored within the chip, and
      decrypt within the chip encrypted data received from a second device external to the chip utilizing the plurality of keys stored within the chip; and
   a two channel ATA host adapter integrated within the chip, wherein each channel is configured to support a master and a slave device, the ATA host adaptor adapted configured to:
      transfer the encrypted data to the second device via an ATA bus external to the chip,
      receive encrypted data provided by the second device via the ATA bus; and
   a second bus interface controller integrated within the chip configured to:
      allow data that is to be encrypted to enter the chip, wherein the data is provided by the first device via a memory bus external to the chip,
   transfer decrypted data to the first device via the first data bus, and
      transfer data from the first external device to the second external device bypassing the encryption/decryption processor.

2. The system of claim 1, further comprising:
   a key selector configured to identify an encryption key from the plurality of keys to be utilized for the encryption of the data.

3. The system of claim 2, wherein the key selector is further configured to identify a decryption key from the plurality of keys to be utilized for the decryption of the encrypted data.

4. The system of claim 3, wherein the key selector is further configured to:
   instruct the encryption/decryption processor to perform the encryption of the data using the encryption key, and
   instruct the encryption/decryption processor to perform decryption of the encryption data using the decryption key.

5. The system of claim 1, further comprising:
   a buffer configured to buffer data received from the first device prior to encryption of the data.

6. The system of claim 5, wherein the buffer is further configured to buffer the encrypted data received from the second device prior to the decryption of the encrypted data.

7. The system of claim 1, wherein the second device includes a memory and a data processing device.

* * * * *

UNITED STATES PATENT AND TRADEMARK OFFICE
CERTIFICATE OF CORRECTION

| | | |
|---|---|---|
| PATENT NO. | : 8,234,504 B2 | Page 1 of 1 |
| APPLICATION NO. | : 10/414575 | |
| DATED | : July 31, 2012 | |
| INVENTOR(S) | : Cheung et al. | |

It is certified that error appears in the above-identified patent and that said Letters Patent is hereby corrected as shown below:

Column 8, lines 23-24, please replace "ATA host adaptor adapted configured to:" with --ATA host adaptor configured to:--.

Signed and Sealed this
Eighteenth Day of December, 2012

David J. Kappos
*Director of the United States Patent and Trademark Office*